United States Patent [19]

Bieber

[11] Patent Number: 4,546,665
[45] Date of Patent: Oct. 15, 1985

[54] H-PATTERN SHIFTER FOR AUTOMATIC TRANSMISSIONS

[76] Inventor: William J. Bieber, Bieber Enterprises, Inc., 21901 Adler Dr., California City, Calif. 93505

[21] Appl. No.: 549,883

[22] Filed: Nov. 9, 1983

[51] Int. Cl.⁴ .............................................. B60K 20/04
[52] U.S. Cl. ..................................... 74/473 R; 74/475
[58] Field of Search ...................... 74/473 R, 475, 476

[56] References Cited

U.S. PATENT DOCUMENTS

| | | | |
|---|---|---|---|
| 1,727,646 | 9/1929 | Hunt et al. | 74/476 |
| 1,807,779 | 6/1931 | Drew | 74/473 R |
| 2,097,566 | 11/1937 | Hummer | 74/473 |
| 2,488,469 | 11/1949 | Farmer | 74/473 |
| 2,917,941 | 12/1959 | Wittren | 74/475 X |
| 3,465,612 | 9/1969 | Letwin et al. | 74/473 |
| 4,297,910 | 11/1981 | Myers | 74/473 R |
| 4,326,432 | 4/1982 | Miller | 74/475 |
| 4,438,657 | 3/1984 | Nobis | 74/473 R X |

*Primary Examiner*—William E. Tapolcal
*Attorney, Agent, or Firm*—Howson and Howson

[57] ABSTRACT

A shifter for use in an automobile having an automatic transmission with Low, Second, and Drive speed ranges shifts the transmission through these ranges in response to movement of the shifter handle in an H-pattern such as normally associated with upshifting or downshifting a three speed manual transmission.

23 Claims, 18 Drawing Figures

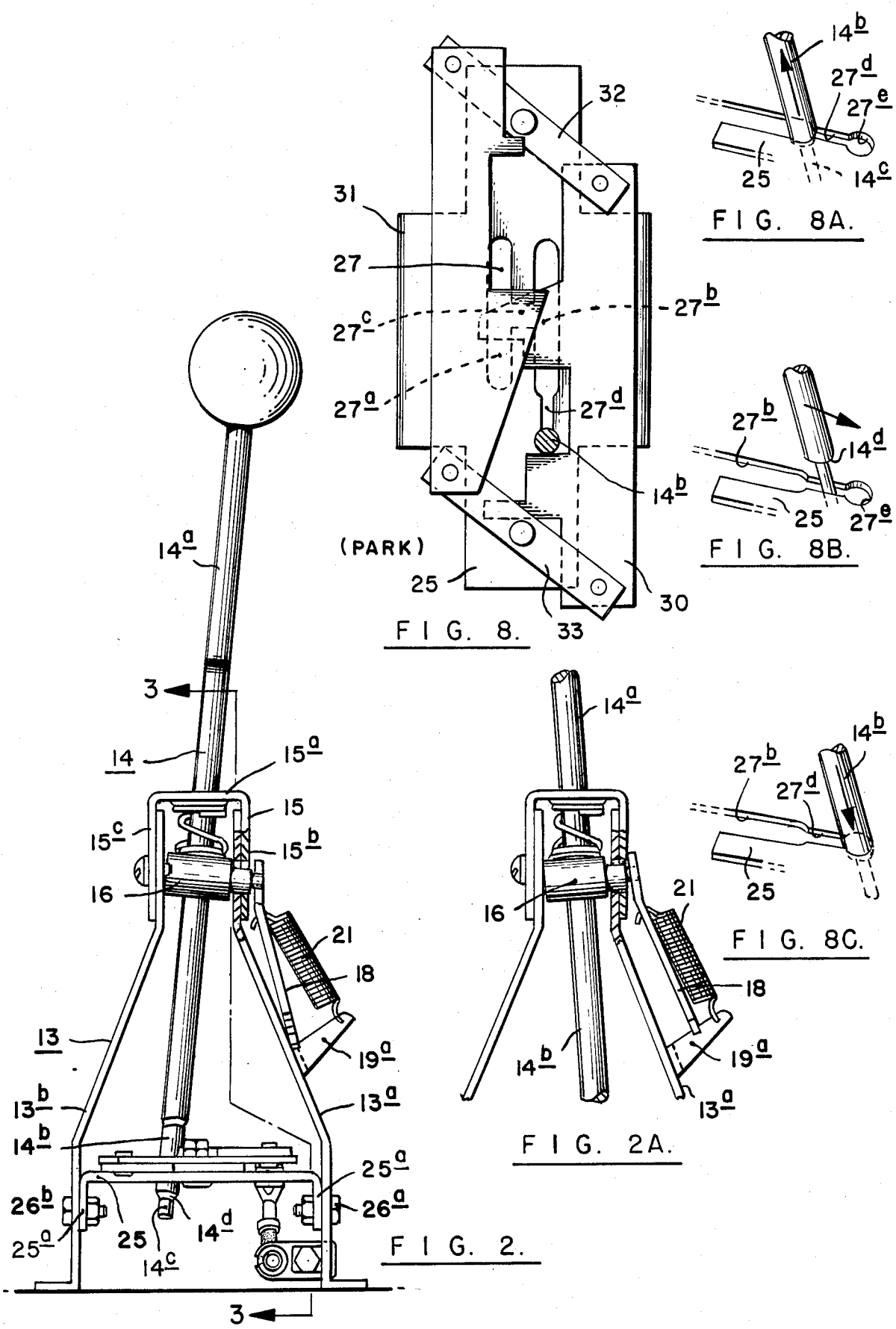

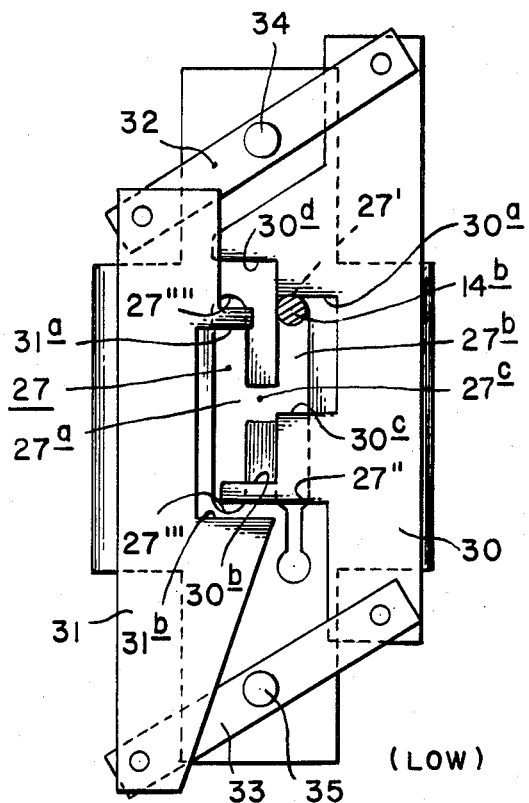
F I G. 4. (LOW)
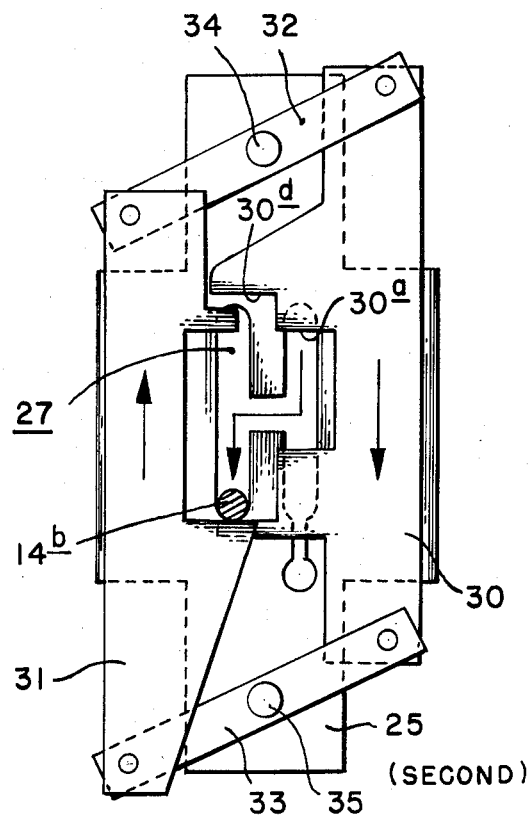
F I G. 5. (SECOND)
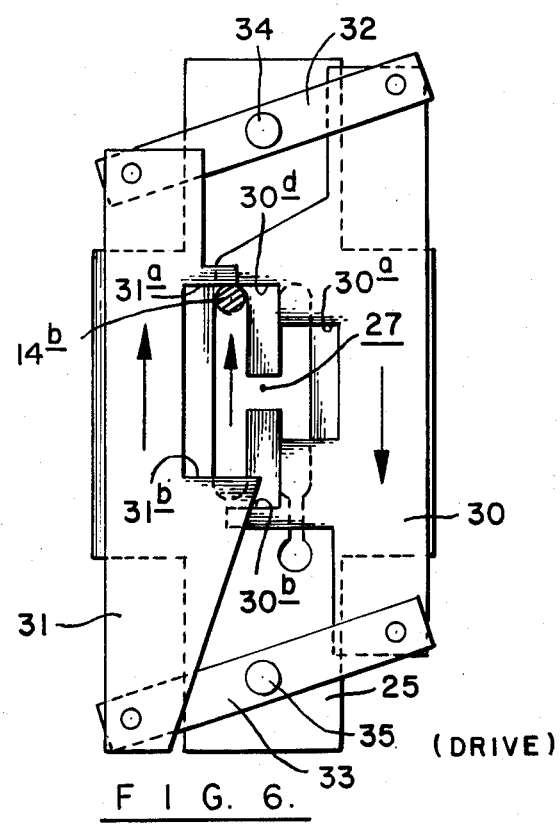
F I G. 6. (DRIVE)
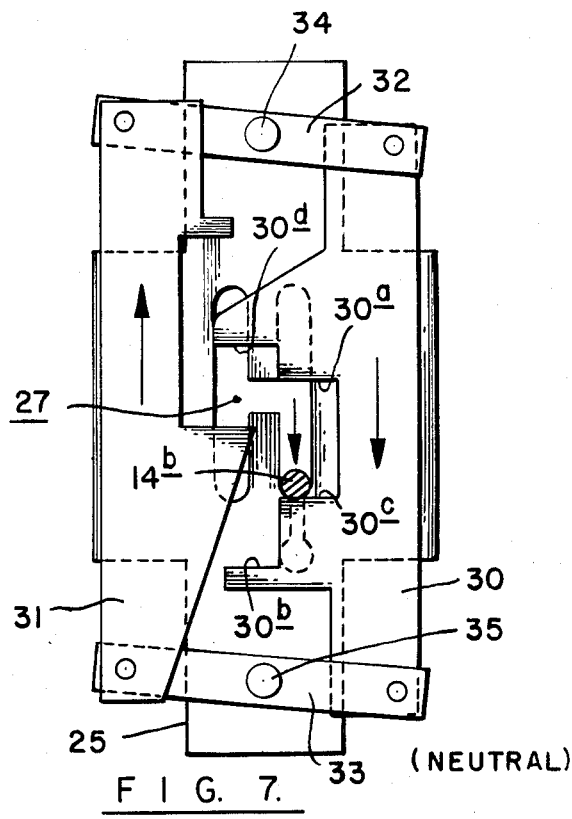
F I G. 7. (NEUTRAL)

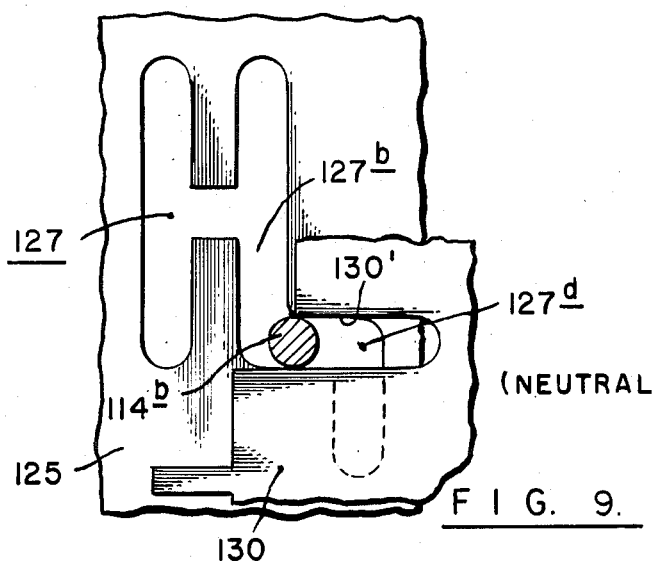
FIG. 9. (NEUTRAL)
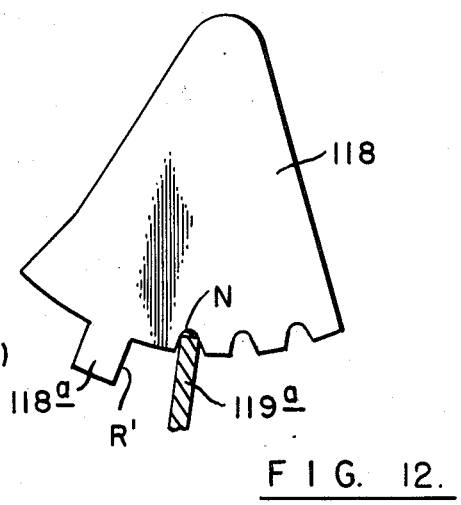
FIG. 12.
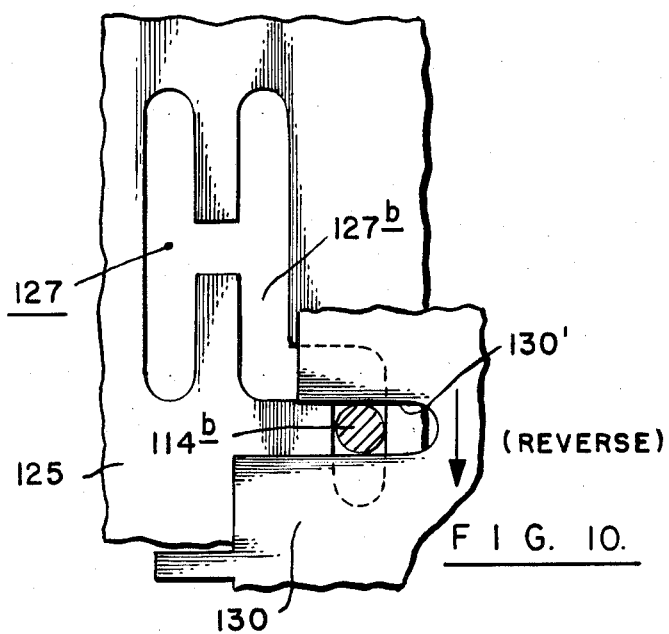
FIG. 10. (REVERSE)
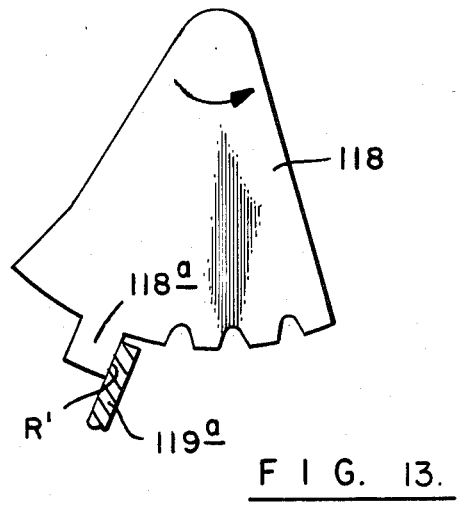
FIG. 13.
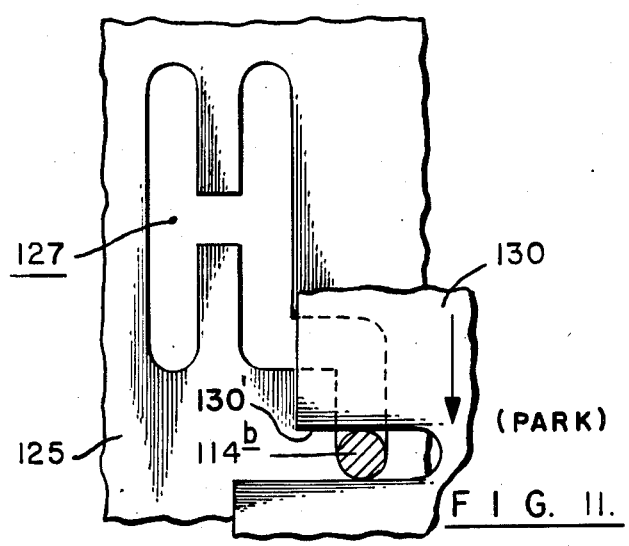
FIG. 11. (PARK)
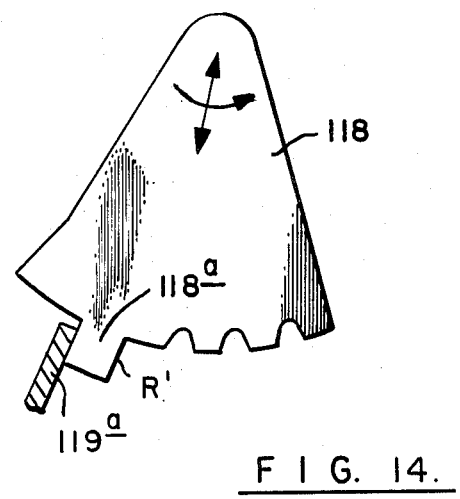
FIG. 14.

H-PATTERN SHIFTER FOR AUTOMATIC TRANSMISSIONS

FIELD OF THE INVENTION

The present invention relates to transmission shifters for vehicles, and more particularly, the present invention relates to a shifter of the type requiring conventional H-pattern handle motion to upshift or downshift an automatic transmission from Low through Drive speed ranges.

BACKGROUND OF THE INVENTION

Most conventional automatic transmissions have three forward speed ranges: Low, Second and Drive. The automatic transmission can normally be upshifted and downshifted through these ranges simply by pivoting a shift lever, mounted either on the steering column or center console, incrementally in a single plane. When rapidly shifting gears during racing, the lever must be pivoted carefully to prevent overshifting, or undershifting.

In a vehicle having a conventional three speed manual transmission, upshifting or downshifting through the three forward speed ranges is accomplished by moving the shift handle in the well-known H-shaped shifting pattern. In such pattern, the shift lever is normally advanced in a dog-leg pattern through a gate when shifting between first and second gears, and in a straight line pattern when shifting between second and third, or between first and reverse. Floor mounted H-pattern shifters have been, and continue to be, popular automotive after-market products.

H-pattern shifters for use in changing gears in vehicles are disclosed in U.S. Pat. Nos. 2,097,566 and 2,488,469. Both of these shifters are intended to be used in combination with manual transmissions. In each of these shifters, however, the shift handle is operatively connected to a pair of transmission actuators.

There have been some attempts to provide for an automatic transmission, a shifter which upshifts and downshifts the transmission through its three forward speed ranges in response to movement of a shift handle in a generally H-type pattern. An example of such a shifter may be found in U.S. Pat. No. 3,465,612. Another shifter which permits shifting in either a straight line or a modified H-pattern is disclosed in U.S. Pat. No. 4,326,432. While each of these automatic transmission shifters may function entirely satisfactorily for its intended purpose, there is a need for an H-pattern shifter which prevents inadvertent overshifting or undershifting, which is relatively simple in construction and reliable in operation, and which accomplishes these ends utilizing a relatively long lever with a short throw to afford installation in confined spaces.

OBJECTS OF THE INVENTION

With the foregoing in mind, a primary object of the present invention is to provide a novel shifter which is designed to be used in combination with an automatic transmission but which requires manipulation of the shifter handle in a conventional H-pattern to upshift or downshift the transmission from Low through Second to Drive speed ranges.

Another object of the present invention is to provide an improved automatic transmission shifter which is designed to be mounted on the floor of a vehicle and to simulate the kind of shift handle motion normally associated with upshifting and downshifting a conventional three speed floor mounted transmission shifter.

A further object of the present invention is to provide a unique H-pattern automatic transmission shifter which is relatively simple in construction and reliable in operation.

Yet another object of the present invention is to provide an H-pattern automatic transmission shifter which has a handle throw motion making it particularly suited for mounting on the floor of an automobile. To illustrate further, the short handle throw combined with various designed shift lever lengths makes it particularly suited for mounting on the floor of vehicles with various seat heights such as conventional passenger cars, pickup trucks, vans, early model cars, hot rods and custom cars.

SUMMARY OF THE INVENTION

More specifically, the present invention provides an automatic transmission shifter which requires a conventional H-pattern shift handle motion either to upshift or to downshift the transmission from Low through Second to Drive speed ranges and back. The shifter comprises a frame, a handle pivotally mounted in the frame, and a series of plates mounted in the frame for converting pivotal motion of the handle into a linear output motion. One of the plates, a gate plate, is mounted stationary in the frame and has an H-shaped guide slot which receives the lower end of the handle for controlling the motion of the handle during shifting. A pair of movable selector plates are mounted to the gate plate by a linkage which couples the selector plates to one another for movement in substantially parallel relation but in opposite directions. Shaped surfaces on the selector plates cooperate with the H-shaped guide slot and the shift handle to displace the selector plates in increments when the shift handle is manipulated in the conventional H-pattern during upshifting or downshifting the transmission through the forward speed ranges. A detent and pawl assembly is provided on the frame for cooperating with the shift handle to releasably retain the shift handle in various selected shift lever positions. The H-shaped guide slot is also provided with shaped slot extensions which cooperate with the selector plates and shift handle to enable the transmission to be placed in Reverse and locked in Park. The shifter functions to convert movement of the shift handle in a dog-leg pattern from Low to Second and in a straight line pattern from Second to Drive into unidirectional motion of the selector plates, one of which is adapted to be coupled to an operating arm on the transmission by means of an actuator cable.

BRIEF DESCRIPTION OF THE DRAWINGS

The foregoing and other objects, features and advantages of the present invention should become apparent from the following description when taken in conjunction with the accompanying drawings, in which:

FIG. 2 is a sectional view taken on irregular line 2—2 of FIG. 1;

FIG. 2A is a fragmentary sectional view of the upper portion of the shifter illustrated in FIG. 2, the view showing the position of the shift handle and detent and pawl mechanism as the shift handle is displaced laterally;

FIGS. 4-8 are sectional views taken along lines 4-8, 4-8 of FIG. 3 to illustrate sequentially the movement of the selector plates and lower end of the shift handle in the course of shifting;

FIGS. 8A-8C are fragmentary perspective views illustrating the motion of the lower portion of the shift handle as it moves into a locked Park position;

FIGS. 9, 10 and 11 are fragmentary plan views of the selector plates in a modified embodiment of the present invention, the views illustrating the relative positions of the selector plates in Neutral, Reverse and Park positions; and FIGS. 12, 13 and 14 are fragmentary views of the detent plate and pawl assembly associated with the modified embodiment, the views illustrating the positions of the assembly corresponding to the positions of the selector plates in Neutral, Reverse and Park positions, respectively.

DESCRIPTION OF THE PREFERRED EMBODIMENT

Figure 1:
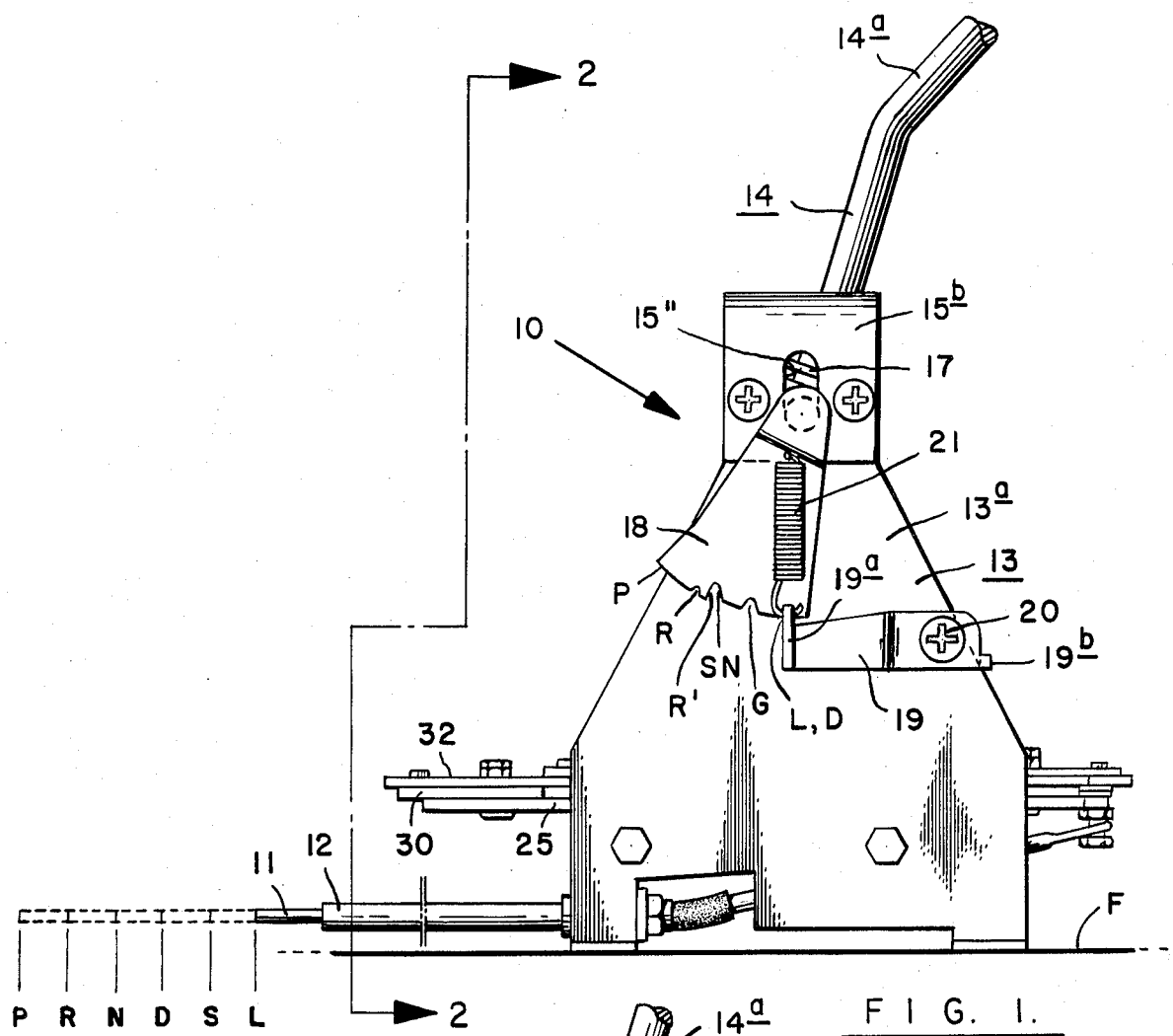
FIG. 1 is a side elevational view of a transmission shifter embodying the present invention.

Referring now to the drawings, FIG. 1 illustrates a shifter 10 embodying the present invention. The shifter 10 is adapted to be mounted on the floor F of a vehicle, such as an automobile, having an automatic transmission with a plurality of forward speed ranges, such as Low, Second and Drive, and having Neutral, Reverse and Park positions arranged in a conventional sequence such as illustrated in FIG. 1. Shifting of the transmission into the various positions occurs when an arm on the automatic transmission (not shown) is pivoted by an actuator having a flexible rod, or cable 11 telescopically received within a flexible sheath 12 extending from the shifter 10 to the transmission shift arm.

As best seen in FIG. 2, the shifter 10 comprises a frame 13 which pivotally mounts a shift handle 14. The shift handle 14 has an upper end portion 14a which projects upwardly from the frame 13 and mounts a knob at its upper end. The shift handle 14 also has a lower end portion 14b which depends into the frame 13 for connection therein to a mechanism to be described.

Figure 3:
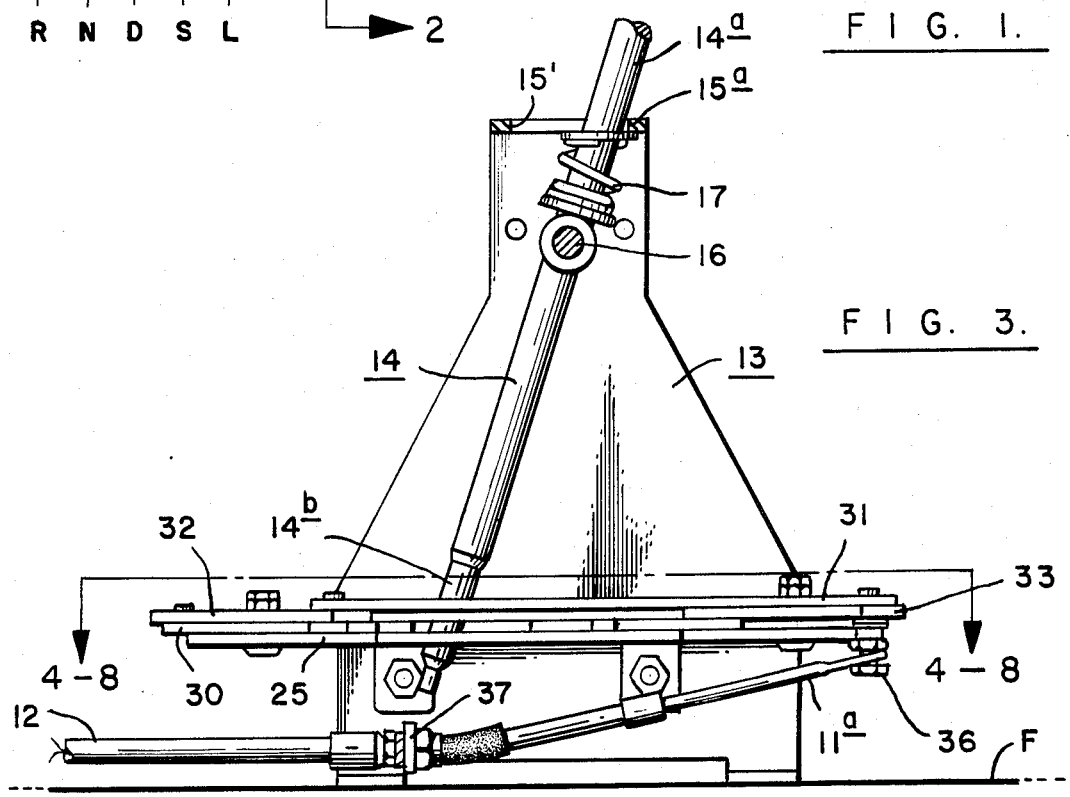
FIG. 3 is a sectional view taken on irregular line 3—3 of FIG. 2.

In the illustrated embodiment, the frame 13 comprises a pair of inwardly-bent trapezoidal-shaped members 13a and 13b which are joined at their upper ends by an inverted U-shaped connector member 15. As best seen in FIG. 3, the connector member 15 has a horizontal portion 15a with a slot 15' therein for loosely receiving the shift handle 14. The connector member 15 also has a pair of downturned flanges 15b and 15c which are fastened outboard of the frame members 13a and 13b, respectively. Each flange, such as the flange 15b, has a vertically-elongated slot, such as the slot 15" (FIG. 1), for pivotally and slidably receiving a trunnion 16 (FIG. 2) carried by the shift handle 14 about one-third the distance up from its lower end 14b. The frame members have slots aligned with the slots 15". The trunnion 16 cooperates with the elongated slots in the connector 15 and frame members 13a and 13b to mount the shift handle 14 for multi-directional pivotal motion, such as forward and rearward motion, and lateral motion such as from the rightward leaning position illustrated in FIG. 2 into the leftward leaning position illustrated in FIG. 2A. For purposes to be described, the shift lever 14 is biased downwardly by means of a compression spring 17 which is interposed between washers engaging the horizontal portion 15a of the connector plate 15 and the trunnion 16. See FIG. 3.

The shift handle 14 is releasably retained in selected shift positions. For this purpose, a detent and pawl assembly is provided on the shifter frame 13. As best seen in FIG. 1, the detent and pawl assembly comprises a detent plate 18 which is connected at its upper end to the end of the trunnion 16 and which depends therefrom along the outside of the frame plate 13a. The lower end of the detent plate 18 has a curved edge in which is provided a series of notches L,D; G; S,N; and R, and a surface P, which are selectively engaged by an upturned end 19a of a pawl 19 pivotally connected adjacent to the rear edge of frame plate 13a by a bolt or pin 20. The notches correspond to the various transmission settings: Low, Drive, Second, Neutral, Reverse and Park, respectively, the G notch corresponding to a gate or transition location to be discussed. The pawl 19 is biased upwardly by means of an extension spring 21 extending between the detent plate 18 and the upturned end 19a of the pawl 19. A tang 19b is provided on the rear end of the pawl 19 to limit its upward pivotal movement about the pivot connection 20. When the pawl 19 is engaged in various notches in the detent plate 18, such as the notch L,D, as illustrated in FIG. 1, the shift lever 14 is releasably retained against inadvertent movement; however, the shift lever can be pivoted readily into any of the various positions due to the detent plate configuration. It is noted that the notches S,N; G and L,D are located closer to the pivot axis of the detent plate 18 than the notch R, and a shoulder R' is provided between the notch S,N and the notch R. Thus shoulder R' engages the pawl tip 19a to prevent the shifter from being inadvertently placed in Reverse, such action requiring combined upward and pivotal motion of the handle as will be described.

According to the present invention, multi-directional pivotal motion of the shift lever 14 is converted into linear motion of the actuator 11 by means of a series of plates mounted horizontally in the shifter frame 13. As best seen in FIG. 2, the series of plates comprise a stationary gate plate 25 and a pair of movable selector plates 30 and 31. The gate plate 25 has downturned flanges 25a and 25b which are fastened to the insides of the frame plates 13a and 13b, respectively by bolts 26a and 26b to tie the frame plates 13a and 13b together near the bottom of the frame 13. The selector plates 30 and 31 overlie the gate plate 25 and are mounted for movement with respect thereto in response to movement of the shift handle 14.

In order to guide the shift handle 14 in its multi-directional pivotal motion, the gate plate 25 has an H-shaped guide slot 27 formed therein. The guide slot 27 slidably receives the lower end 14b of the shift handle 14 and has a pair of forwardly and rearwardly extending parrallel legs 27a and 27b connected together centrally by a gate 27c. Opposite ends of each leg of the slot 27, such as the left leg 27a, are provided with abutment surfaces such as the surfaces 27', 27", 27''' and 27''''. In the illustrated embodiment the abutment surfaces 27'-27''''limit motion of the shift handle 14 by engaging its lower end 14b.

In the conventional H-pattern three speed floor mounted shifter, the shift handle knob is customarily positioned at the lower left when the transmission is in first gear. When upshifting to second, the shift handle is pivoted forwardly to the neutral position, moved laterally to the right, and is again pivoted forwardly into an upper right location. When shifting into third gear, the upper end of the shift lever is pivoted rearwardly in a straight line.

In the present invention, the same action of the shift lever causes the automatic transmission connected thereto to be upshifted from Low, through Second, to Drive speed ranges. However, since the pivot connection between the shift handle 14 and the frame 13 is located above the guide plate 25, the lower end 14b of the shift lever moves in a direction opposite that of the upper end 14a of the shift lever 14. Thus, as will be described more fully hereinafter, when upshifting, the lower end 14b of the shift lever 14 advances from the upper right position illustrated in FIG. 4, corresponding to Low speed range, through the gate 27c in the direction indicated by the arrow in FIG. 5 into the lower left position, corresponding to Second speed range, and forwardly in the direction indicated by the arrow in FIG. 6 into the position corresponding to Drive speed range. The lower portion 14b of the shifter handle 14 is displaced in the direction indicated by the arrow in FIG. 7 to place the transmission in Neutral, Reverse and Park positions, as will be discussed.

The aforementioned multi-directional pivotal motion of the shift handle 14 is converted into linear motion of the actuator 11 by the pair of selector plates 30 and 31 which are mounted in the frame 13 for movement relative to the gate plate 25. As best seen in FIG. 4, the selector plates 30 and 31 are connected together for movement in substantially parallel relation but in opposite directions with respect to the guide slot 27 in the engate plate 25. In the illustrated embodiment, the selector plates 30 and 31 are coupled together by links 32 and 33 each of which is connected at its opposite ends to front and rear opposite ends of the guide plates 30 and 31. The links 32 and 33 are pivotally connected to the gate plate 25 by pins 34 and 35 which are located on a line extending forwardly and rearwardly centrally between the left and right hand legs 27a and 27b of the H-shaped guide slot 27. The first, or right hand, selector plate 30 is located closely alongside the gate plate 25 and is connected to the underside of the links 32 and 33. The second, or left hand, selector plate 31 is connected to the upper sides of the links 32 and 33. Thus, the selector plates 30 and 31 are located relatively close to the gate plate 25 and are mounted for movement in closely spaced parallel relation therewith in response to movement of the shift lever 14.

In order to advance the actuator rod 11 forwardly in the course of upshifting the automatic transmission from Low through Second to Drive speed ranges, the actuator rod 11 is coupled to one or the other of the selector plates 30 and 31. In the illustrated embodiment, as best seen in FIG. 3, the rear end 11a of the actuator rod 11 is coupled to the selector plate 31 by a pivot pin assembly 36 which, in the illustrated embodiment, also passes through the link 33. The actuator sheath 12 is anchored in the shifter frame 13 below the gate plate 25 by conventional fastening means 37. As a result, the pin assembly 36 provides a single means for transmitting the motion of the selector plates 30 and 31 to the transmission via the actuator assembly 11,12.

When the upper end 14a of the shift handle 14 is in the lower left position, the lower end 14b thereof is at the upper right, and the selector plates 30 and 31 are arranged as illustrated in FIG. 4 corresponding with the shifter and transmission being placed in Low. Movement of the upper end 14a of the shift handle 14 forwardly and laterally in a dog-leg pattern causes the lower end 14b of the shift handle 14 to advance in the direction indicated by the arrow in FIG. 5 for pivoting the selector plates 30 and 31 in the directions of the arrows into the positions indicated therein. This motion causes the actuator 11 to advance from the L or Low position to the S or Second position in FIG. 1. A rearward pull on the upper end 14a of the shift handle 14 displaces the lower end 14b thereof forwardly in the direction of the arrow in FIG. 6 to place the transmission in Drive.

The selector plates 30 and 31 are displaced in discrete increments in response to movement of the shift handle 14. For this purpose, surface means is provided on each selector plate 30 and 31 and is disposed transversely with respect to the guide slot 27 for releasably engaging the lower portion 14b of the shift handle 14. As best seen in FIG. 4, the surface means on the first selector plate 30 comprises a forwardly located surface 30a which extends inwardly across the right hand leg 27b of the guide slot 27 and which, when engaged by the lower end 14b of the shift lever 14 and aligned with the abutment surface 27', causes the selector plates 30 and 31 to assume the position illustrated in FIG. 4 wherein the actuator 11 places the transmission in Low speed range. The first selector plate 30 also has a second surface 30b which is located rearwardly on the selector plate 30 and is offset further inward with respect to the first surface 30a. The second surface 30b extends across the second leg 27a of the guide slot 27 and is adapted, when aligned with the abutment surface 27''' and engaged by the lower end 14b of the shift handle 14, to place the selector plates 30 and 31 in the position illustrated in FIG. 5 wherein the actuator 11 is extended into the Second speed range indicated in dotted lines in FIG. 1.

The surface means on the left hand or second selector plate 31 includes a forward surface 31a and a rearward surface 31b both of which extend across the left leg 27a of the H-shaped guide slot 27 in spaced parallel relation. The surface 31a cooperates with the abutment surface 27'''' at the upper or forward end of the left leg 27a of the guide slot 27 to place the selector plates 30 and 31 in the position illustrated in FIG. 6 when engaged by the lower end 14b of the shift handle 14. The surface 31b cooperates with the abutment surface 27''' to reposition the selector plates 30 and 31 in the position illustrated in FIG. 5 when downshifting from Drive to Second. For example, when the selector plate 31 is in the position illustrated in FIG. 6, its surface 31a is spaced forwardly of the abutment surface 27''' when the surface 31a is aligned with the abutment surface 27''''. In downshifting from Drive to Second, the upper end 14a of the shift handle 14 is pivoted forwardly to cause its lower end 14b to move rearwardly in a direction opposite the direction indicated by the arrow in FIG. 6. When this occurs, the lower end 14b of the shift handle 14 engages the rearward surface 31b (which is spaced forward of the abutment surface 27''') to displace the selector plates 30 and 31 into the position illustrated in FIG. 5 corresponding to the Second speed range of the transmission. Downshifting from Second to Low occurs when the shift handle 14 is manipulated to cause its lower end 14b to move in the direction opposite the arrow in FIG. 5 to engage the surface 30a of the first selector plate 30 to displace the selector plates 30 and 31 into the position illustrated in FIG. 4.

Simultaneously with the movement of the selector plates 30 and 31, the detent plate 18 (FIG. 1) is being pivoted relative to the pawl 19. For instance, when the selector plates 30 and 31 are in the "Low" position illustrated in FIG. 4, the pawl tip 19a is engaged in the detent plate notch L,D as shown in FIG. 1. When the shift lever 14 is pivoted to place the selector plates 30 and 31 in the "Second" position illustrated in FIG. 5, the detent plate 18 pivots counterclockwise (FIG. 1) to cause the pawl tip 19a to engage in the notch S,N. When the shift lever 14 is pivoted again to place the selector plates 30 and 31 in the "Drive" position illustrated in FIG. 6, the detent plate 18 is pivoted clockwise to cause the pawl tip 19a again to engage in the L,D notch.

The notches in the detent plate 18 are located at angular locations which correspond to the angular disposition of the shift handle 14 when in its limit positions. To enable the driver to "feel" the location of the gate 27c in the guide slot 27, the detent plate 18 is provided with a gate notch G located between the notches S, N and L,D. Thus, when the shift lever 14 is placed in its "Neutral" position, the pawl tip 19a engages in the gate notch G. However, by virtue of the lateral extent of the pawl tip 19a with respect to the frame plate 13a, as best seen in FIG. 2, the shift handle 14 can be pivoted laterally from side to side without disengaging the pawl tip 19a from its notch to simulate the feel of "Neutral" gear in a three speed manual transmission. Compare the position of the detent plate 18 in FIG. 2 with its position in FIG. 2A.

To place the transmission in Neutral, the selector plates 30 and 31 are pivoted into the position illustrated in FIG. 7. For this purpose, the first selector plate 30 is provided with a surface 30c spaced rearwardly from the surface 30a and extending across the right leg 27b of the guide slot 27. When the surface 30c is engaged by the lower end 14b of the shift handle 14, and the shift handle is pivoted, the selector plates pivot clockwise from the position illustrated in FIG. 6 to the position illustrated in FIG. 7.

To enable the transmission shifter to be placed in Drive, from Neutral, or from any of the other forward positions, the first selector plate 30 is provided with yet another surface 30d which is located forward of the surface 30b and which extends across the left leg 27a of the guide slot 27. Thus, when the shifter is in Neutral as illustrated in FIG. 7, the shift handle can be pivoted rearwardly, laterally, and then again rearwardly to cause its lower end 14b to move in the opposite directions and engage the surface 30d for pivoting the selector plates clockwise into the Drive position illustrated in FIG. 6.

The shifter can be locked in Park position. To this end, as best seen in FIG. 8, the right leg 27b of the guide slot 27 is provided with a rearward extension 27d which terminates in an enlargement 27e. See FIG. 8A. The lower end of the shift lever has a terminal end with a reduced diameter portion 14c which is dimensioned to pass through the extension 27d. The enlargement 27e is dimensioned to receive the lower handle portion 14b. Thus, the shifter can be locked in Park simply by pulling upward on the shift lever 14 to raise the terminal end 14c, pivoting the shift lever forwardly to cause its end 14c to pass through the extension 27d, and after the shift handle has been pivoted full forward, permitting the compression spring 17 to urge the lower end 14b of the shift handle 14 downward to engage it in the enlargement 27e. This locks the shift handle 14 and hence the shifter and transmission in Park as illustrated in FIG. 8. This operation may best be seen by reference to the sequence of views in FIGS. 8A-8C showing the motion of the shift lever in placing the shifter in Park.

To place the shifter, and hence the transmission, in Reverse, the shift handle 14 is raised upwardly and pivoted halfway between the Neutral and Park positions and released. The spring 17 biases the handle 14 downwardly and causes the shoulder 14d at the lower end of the shift handle 14 (FIG. 8B) to rest on top of the gate plate 25. As best seen in FIG. 1, lifting the shift handle 14 raises the detent plate 18 and disengages the pawl tip 19a from the stop surface R', and lowering the handle 14 after it has been pivoted causes the pawl tip 19a to engage in the notch R for releasably securing the shift handle 14 in the Reverse position. It is noted that the pawl tip 19a engages the surface P of the detent plate 18 when the shift lever 14 is locked in Park position.

In a modified embodiment of the present invention, a slightly different motion of the shift handle is required to place the shifter, and hence the transmission, in Reverse and Park positions. To this end, as best seen in FIGS. 9-14, the H-shaped guide slot 127 in the gate plate 125 is provided with an L-shaped slot extension 127d which extends laterally and rearwardly from the rear end of the right leg 127b of the guide slot 127. The first selector plate 130 is provided with a notch 130' sized to receive the lower end 114b of the shift handle. Thus, as seen in FIG. 9, the shifter, and hence transmission, is in Neutral when the lower end 114b of the shift handle is in the position shown. To place the shifter in Reverse, the upper end of the shift lever is pivoted leftward to move its lower end 114b rightward into the notch 130' in the selector plate 130. Thereafter, the upper end of the shift lever is pivoted forwardly, to cause its lower end to move rearwardly in the direction indicated by the arrow in FIG. 10 wherein the selector plate 130 moves rearwardly into the position indicated. When in that position, the pawl tip 119a is engaged against the stop surface R' (FIG. 13) on a tang 118a of the detent plate 118, the detent plate 118 having been pivoted counterclockwise from the position illustrated in FIG. 12 wherein the pawl tip 119a is engaged in the "N" notch in the detent plate 118.

To place the shifter of the modified embodiment in Park, the shift handle is raised and pivoted further forwardly causing the lower end 114b thereof to move rearwardly in the slot extension 127d into the position illustrated in FIG. 11. This causes the selector plate 130 to move further rearward for further extending the actuator cable coupled thereto. The act of raising the shift handle causes the detent plate 118 connected thereto to move upwardly also, and this permits the tang 118a of the detent plate 118 to clear the pawl tip 119a and to latch behind the same after the detent plate 118 has been pivoted and lowered into the position illustrated in FIG. 14 in response to pivotal motion and lowering of the handle. Thus, it may be seen that in the modified embodiment a different handle motion is required to place the shifter in Reverse and Park than required in the first-described embodiment, all other aspects of the two embodiments being the same.

In view of the foregoing, it should be apparent that the present invention now provides an improved H-pattern shifter for automatic transmissions. The shifter has relatively few moving parts and is, therefore, relatively inexpensive to manufacture and reliable in operation. The shifter enables a driver to upshift and downshift through the forward speed ranges rapidly without overshifting or undershifting. The shifter accomplishes the above in a minimum of space and with a minimum handle throw thereby permitting a relatively long handle to be used.

While preferred embodiments of the present invention have been described in detail, various modifications, alterations and changes may be made without departing from the spirit and scope of the present invention as defined in the appended claims.

I claim:

1. For use in a vehicle having an automatic transmission with Low, Second and Drive forward speed ranges, a shifter, comprising:
   a frame adapted to be mounted on the floor of the vehicle,
   a shift handle having an upper end projecting upwardly from said frame and having a depending lower portion,
   means mounting said shift handle in said frame for multi-directional pivotal motion,
   a gate plate mounted stationary in said frame and having a guide slot slidably receiving the lower portion of said handle for guiding the pivotal motion of said shift handle in a substantially H-shaped shift pattern,
   first and second movable selector plates disposed in said frame adjacent to said gate plate,
   linkage means in said frame coupling said selector plates for movement in unison but in opposite directions relative to one another,
   surface means on said selector plates extending across portions of said guide slot and adapted to be selectively engaged by the lower portion of said shift handle for cooperating with said guide slot and said shift handle to displace said selector plates when said shift handle is pivoted, and
   coupling means adapted to transmit motion of one of said selector plates to the transmission for shifting the same, whereby the shift lever causes both selector plates to move relative to the gate plate when engaged with the surface means and pivoted.

2. A shifter according to claim 1 wherein said guide slot has abutment surface means cooperable with the lower portion of the shift lever and said selector plate surface means to dispose the selector plates in a selected shift position.

3. A shifter according to claim 2 wherein said abutment surface means includes an abutment surface located at one end of one leg of said H-shaped guide slot and engageable by the lower portion of said shift handle to position the transmission shifter in Low speed range.

4. A shifter according to claim 1 wherein said guide slot has first and second parallel legs connected by a transverse gate, and said linkage means mounts said selector plates for movement substantially parallel to said slot legs and to said gate plate.

5. A shifter according to claim 4 wherein said surface means includes a plurality of surfaces on said selector plates disposed transverse to said slot legs and adapted to advance lengthwise of said slot legs as said selector plates pivot.

6. A shifter according to claim 5 wherein said surfaces on said first selector plate include a forward outboard surface adapted to advance along the first leg of said guide slot to position the shifter in Low range and a rearward inboard surface adapted to advance along the second leg of said guide slot to position the shifter in Second range during an upshift, and said surfaces on said second selector plate includes a forward surface adapted to advance along the second leg of said guide slot to position the shifter in Drive range during an upshift.

7. A shifter according to claim 6 wherein said second selector plate has a rearward surface adapted to advance along the second leg of said guide slot to position the shifter in Second during a downshift from Drive, and said first selector plate has a forward inboard surface adapted to advance along said second leg of said guide slot to place said shifter in Drive.

8. A shifter according to claim 7 wherein said first selector plate has a rearward outboard surface adapted to advance along said first leg of said guide slot for positioning said shifter in Neutral, Reverse and Park positions.

9. A shifter according to claim 8 wherein said first leg of said H-shaped guide slot has a necked-down extension terminating in an enlargement, and said lower portion of said shift lever is sized to pivot through said necked-down extension when raised upwardly and to engage in said enlargement when lowered downwardly to lock said shifter in Park.

10. A shifter according to claim 7 wherein the first leg of said H-shaped guide slot has a laterally-offset rearward extension, and said first selector plate has a lateral notch opening toward said first leg and said extension for receiving the lower end of the shift lever, said shift lever when engaged in said notch and pivoted adapted to place said shifter in Reverse and Park positions.

11. A shifter according to claim 10 including means mounting said shift lever in said frame for lengthwise displacement, a detent plate coupled to said shift lever for movement therewith, said detent plate having a series of notches and a stop tang, and a pawl pivotally mounted to said frame and adapted to releasably engage said notches and stop tang in response to pivotal movement of the shift lever between various shift positions.

12. A shifter according to claim 1 wherein said linkage means includes a pair of bars each pivotally connected adjacent its opposite ends to one end of each selector plate, and means pivotally connecting said links certrally thereof to said gate plate along an axis extending lengthwise between legs of said guide slot, whereby said selector plates move in substantially parallel relation but in opposite directions during shifting.

13. A shifter according to claim 1 wherein said gate plate is mounted horizontally in said frame below the pivot axis of said shift handle, and said selector plates are disposed parallel to said gate plate in relatively closely spaced relation therewith.

14. A shifter according to claim 1 wherein said frame includes a pair of side plates, and said shift handle mounting means includes a pair of slots in said side plates and a trunnion carried by said shift handle and received in said slots.

15. A shifter according to claim 1 including a detent plate connected to said shift handle for pivotal movement therewith, and latching means mounted on said frame for releasably engaging said detent plate to retain said shift handle in selected shifted positions.

16. A shifter according to claim 15 wherein said detent plate has a series of notches therein corresponding to various transmission settings, and said latching means includes a pawl releasably engaging in selected ones of said notches, and means biasing said pawl into engagement with said notches in said detent plate.

17. A shifter according to claim 1 including an extensible actuator adapted to be connected at one end to the transmission and at its other end to said coupling means, and means anchoring said actuator to said shifter frame below said gate plate.

18. For use with an automatic transmission to afford conventional H-pattern pivotal shift handle motion for upshifting and downshifting the transmission from Low through Drive forward speed ranges, a shifter comprising:

a frame, a shift handle pivotally mounted in said frame, a gate plate fixedly mounted in said frame and having an H-shaped slot slidably receiving said shift handle for controlling the motion thereof, first and second selector plates disposed alongside said gate plate in said frame, coupling means for transmitting motion from one of said plates to the transmission for shifting the same, means linking said selector plates together for substantially parallel movement in opposite directions with respect to said slot in said gate plate, and surface means on said selector plates disposed transverse to said H-shaped guide slot and arranged with respect thereto and with respect to one another to cause said one selector plate to advance in one direction when said shift handle is manipulated in the conventional manner to upshift from Low through Drive speed ranges and to advance in the opposite direction when manipulated in the same way in the opposite direction to downshift from Drive through Low speed ranges.

19. A transmission shifter, comprising:

a frame, a shift handle pivotally mounted in said frame, means in said frame defining a stationary H-shaped guide slot for slidably receiving said handle and guiding the motion thereof in an H-shaped pattern, a pair of selector plates having surfaces selectively engageable by said shift handle as it advances in said guide slot, means mounting said selector plates for movement substantially parallel to one another and in opposite directions during movement of said handle in a dog-leg pattern when engaged with said surfaces and upshifting from Low to Second speed ranges and during movement of said handle in a straight line pattern when engaged with said surfaces and upshifting from Second to Drive speed ranges, and means adapted to transmit motion of one of said selector plates to the transmission for shifting the same.

20. A transmission shifter according to claim 19 wherein said selector plate mounting means includes a pair of links pivotally mounted in said frame forwardly and rearwardly of said guide slot, and means pivotally connecting each link adjacent its ends to said selector plates.

21. A transmission shifter according to claim 20 wherein said H-shaped guide slot has abutment surfaces at the ends thereof, and said selector plate surfaces are located with respect to said abutment surfaces and with respect to one another for cooperating with said shift handle to cause said selector plates to advance in increments during upshifting and downshifting.

22. A transmission shifter according to claim 19 including detent and latching means carried on said frame and movable in response to movement of said shift handle for releasably securing said handle in selected shift positions.

23. A shifter for use with an automatic transmission having Low, Second and Drive speed ranges selectable in response to linear motion of an actuator connected thereto, said shifter comprising a frame, a shift handle mounted for multi-planar pivotal motion in the frame, and a mechanism for converting the multi-planar pivotal motion of the handle into linear motion of the actuator for upshifting and downshifting the transmission through the speed ranges, said mechanism including gate plate means having an H-shaped guide slot mounted said frame and slidably receiving said handle for guiding the motion of said handle in an H-shaped pattern, a pair of selector plates mounted in said frame alongside said gate plate for movement in planes substantially parallel thereto, a pair of links coupling said selector plates together for movement substantially parallel to one another but in opposite directions, each of said selector plates haivng surfaces disposed across said guide slot and adapted to be engaged by said shift handle, said selector plate surfaces cooperating with said guide slot and said shift handle to displace one of said selector plates unidirectionally in response to combined multi-planar pivotal motion of the shift handle when upshifting or downshifting through said speed ranges, and means adapted to transmit motion of one selector plate to said actuator for displacing the same linearly in response to movement of said one selector plate.

* * * * *